United States Patent
Wang et al.

(10) Patent No.: US 7,433,711 B2
(45) Date of Patent: Oct. 7, 2008

(54) MOBILE COMMUNICATIONS TERMINAL AND METHOD THEREFOR

(75) Inventors: Kongqiao Wang, Beijing (CN); Hao Wang, Beijing (CN); Yipu Gao, Beijing (CN)

(73) Assignee: Nokia Corporation, Espoo (FI)

( * ) Notice: Subject to any disclaimer, the term of this patent is extended or adjusted under 35 U.S.C. 154(b) by 597 days.

(21) Appl. No.: 11/023,130

(22) Filed: Dec. 27, 2004

(65) Prior Publication Data

US 2006/0142054 A1 Jun. 29, 2006

(51) Int. Cl.
*H04M 1/00* (2006.01)

(52) U.S. Cl. ............... 455/556.1; 455/566; 455/557

(58) Field of Classification Search ............ 455/556.1, 455/566, 412.1, 414.1, 575.3, 556.2, 557, 455/575.1; 382/182, 305, 209, 224, 159; 707/10

See application file for complete search history.

(56) References Cited

U.S. PATENT DOCUMENTS

| | | | |
|---|---|---|---|
| 2003/0152293 A1* | 8/2003 | Bresler et al. ............ | 382/305 |
| 2003/0236104 A1 | 12/2003 | Lin | |
| 2004/0046745 A1 | 3/2004 | Hayashi | |
| 2004/0046756 A1 | 3/2004 | Kim et al. ............... | 345/204 |
| 2004/0141644 A1* | 7/2004 | Kurosawa ............... | 382/182 |
| 2005/0143136 A1* | 6/2005 | Lev et al. ............... | 455/566 |
| 2006/0034601 A1* | 2/2006 | Andersson et al. ...... | 396/157 |
| 2006/0053374 A1* | 3/2006 | Wilensky ............... | 715/716 |
| 2006/0204110 A1* | 9/2006 | Steinberg et al. ......... | 382/224 |
| 2007/0118535 A1* | 5/2007 | Schwesig et al. ......... | 707/10 |
| 2008/0094496 A1* | 4/2008 | Wang et al. ............. | 348/333.1 |

FOREIGN PATENT DOCUMENTS

| | | |
|---|---|---|
| EP | 0 678 822 A2 | 10/1995 |
| EP | 1 387 560 A2 | 2/2004 |
| EP | 1 411 460 A2 | 4/2004 |

OTHER PUBLICATIONS

International Search Report, PCT/IB2005/003788, mailed Mar. 31, 2006.
Written Opinion of the International Searching Authority, PCT/IB2005/003788, mailed Mar. 31, 2006.

\* cited by examiner

*Primary Examiner*—Tan Trinh
(74) *Attorney, Agent, or Firm*—Perman & Green, LLP

(57) ABSTRACT

A user of a camera equipped communication terminal is aided by the use of the invention when, e.g., dialing a phone number, sending a message to a recipient associated with the phone number, or simply store the phone number in a contact database in the terminal, The camera is pointed in the direction of a surface on which a sequence of symbols presumed to be a telephone number is written, The field of view is aimed using the guiding pattern and, e.g. by pressing a button or selecting an action from a menu, the symbol sequence is recorded in an image, The image, i.e. a sub-image containing the sequence of symbols, is then subjected to optical character recognition (OCR) processing that interprets the sequence of symbols as a telephone number to be used in an application that performs the dialing, message sending or storage into the contact database.

19 Claims, 3 Drawing Sheets

MOBILE COMMUNICATIONS TERMINAL AND METHOD THEREFOR

BACKGROUND OF THE INVENTION

1. Field of the Invention

The present invention relates to a mobile communication terminal and a method of controlling a mobile communication terminal when entering a telephone number.

2. Brief Description of Related Developments

Communication devices have during the last decades evolved from being more or less primitive telephones, capable of conveying only narrow band analog signals such as voice conversations, into the multimedia mobile devices of today capable of conveying large amounts of data representing any kind of media. For example, a telephone in a GSM, GPRS, EDGE, UMTS or CDMA2000 type of system is capable of recording, conveying and displaying both still images and moving images, i.e. video streams, in addition to audio data such as speech or music.

These applications are typically very demanding in terms of processing power and image rendering capabilities of the communication device. However, the more basic or "primitive" ways of using a mobile communication terminal, e.g. the simple task of entering a phone number, have not improved much over the years.

Of course, there exist a number of ways in which entering is facilitated according to prior art. For example, by organizing the memory of a mobile communication terminal and by providing a suitably programmed user interface, so-called "phone book" or "contact" management applications may provide a faster and sometimes faster way in which a user can enter a desired phone number and thereby initiate a call or send a message.

A drawback with such prior art solutions is, however, that they require a user to master the skill of programming the memory of the terminal. Moreover, these prior art solutions require a priori knowledge of, e.g., a telephone number. That is, in order to enter a phone number, the user must have provided the phone number to the "phone book" in the memory of the terminal.

SUMMARY OF THE INVENTION

It is an object of the present invention to overcome the drawbacks relating to prior art communication terminals as discussed above.

The object is achieved by way of a method, a communication terminal and a computer program according to the appended claims.

Hence, according to a first aspect of the present invention, a mobile communication terminal is controlled, while the terminal is in an image recording mode during which a camera view is displayed, by way of:

displaying a guiding pattern configured such that it facilitates for a user to adjust the camera view, recording an image, extracting a sub-image comprising an array of picture elements from the recorded image, said sub-image being at a position within the recorded image that corresponds with the guiding pattern being displayed, performing an optical character recognition process on the extracted sub-image, yielding a sequence of symbols, displaying the recognized sequence of symbols, receiving a signal indicating that the recognized sequence is to be interpreted as a telephone number, and initiating a control application, an input to which is the telephone number.

In a preferred embodiment, the initiation of the control application comprises initiation of a telephone call using the telephone number. In another preferred embodiment, the initiation of the control application comprises initiation of a message transmission using the telephone number. Alternatively, the initiation of the control application comprises initiation of a contact management application into which the telephone number is input.

A user of a camera equipped communication terminal is hence aided by the use of the invention when, e.g., dialing a phone number, sending a message to a recipient associated with the phone number, or simply store the phone number in a contact database in the terminal. The camera is pointed in the direction of a surface on which a sequence of symbols presumed to be a telephone number is written. The field of view is aimed using the guiding pattern and, e.g. by pressing a button or selecting an action from a menu, the symbol sequence is recorded in an image. The image, i.e. a sub-image containing the sequence of symbols, is then subjected to optical character recognition (OCR) processing that interprets the sequence of symbols as a telephone number to be used in an application that performs the dialing, message sending or storage into the contact database.

An advantage of the invention is that it relieves the user from being forced to master the skill of pressing a number of buttons on the terminal keypad as well as obviating the need for a priori knowledge of a telephone number. These advantages are particularly accentuated when the user is physically disabled or prevented in any other way of manipulating a terminal keypad.

Consequently, with the present invention it is both easier, faster and more reliable to enter a phone number. One situation where this would be particularly useful is when a user tries to enter a phone number in a bumpy situation, such as a subway train or a bus. Here it can be hard to enter the phone number correctly as the user's eyes have to repetitively shift focus between a source of the phone number, e.g. a business card and a mobile phone display and keypad, resulting in the user often losing track of what part of the number has already been input. Using the present invention the user does not have to repetitively shift focus between the business card and phone.

Preferably, the step of displaying the guiding pattern comprises displaying a straight line. Alternatively, the step of displaying the guiding pattern comprises displaying a rectangle, two parallel lines or any number of symbols including, for example, square brackets ('[', ']'), plus signs ('+'), vertical lines ('|'), arrows ('→', '←'), L-shapes ('⌊', '⌋') or any other suitable shape.

Moreover, the step of extracting the sub-image may, in a preferred embodiment include receiving position information that defines the position of the sub-image within the recorded image. The position information is preferably in the form of position indication signals from touch-sensing means of a display unit in the terminal.

DETAILED DESCRIPTION OF THE PREFERRED EMBODIMENT(S)

Figure 1:
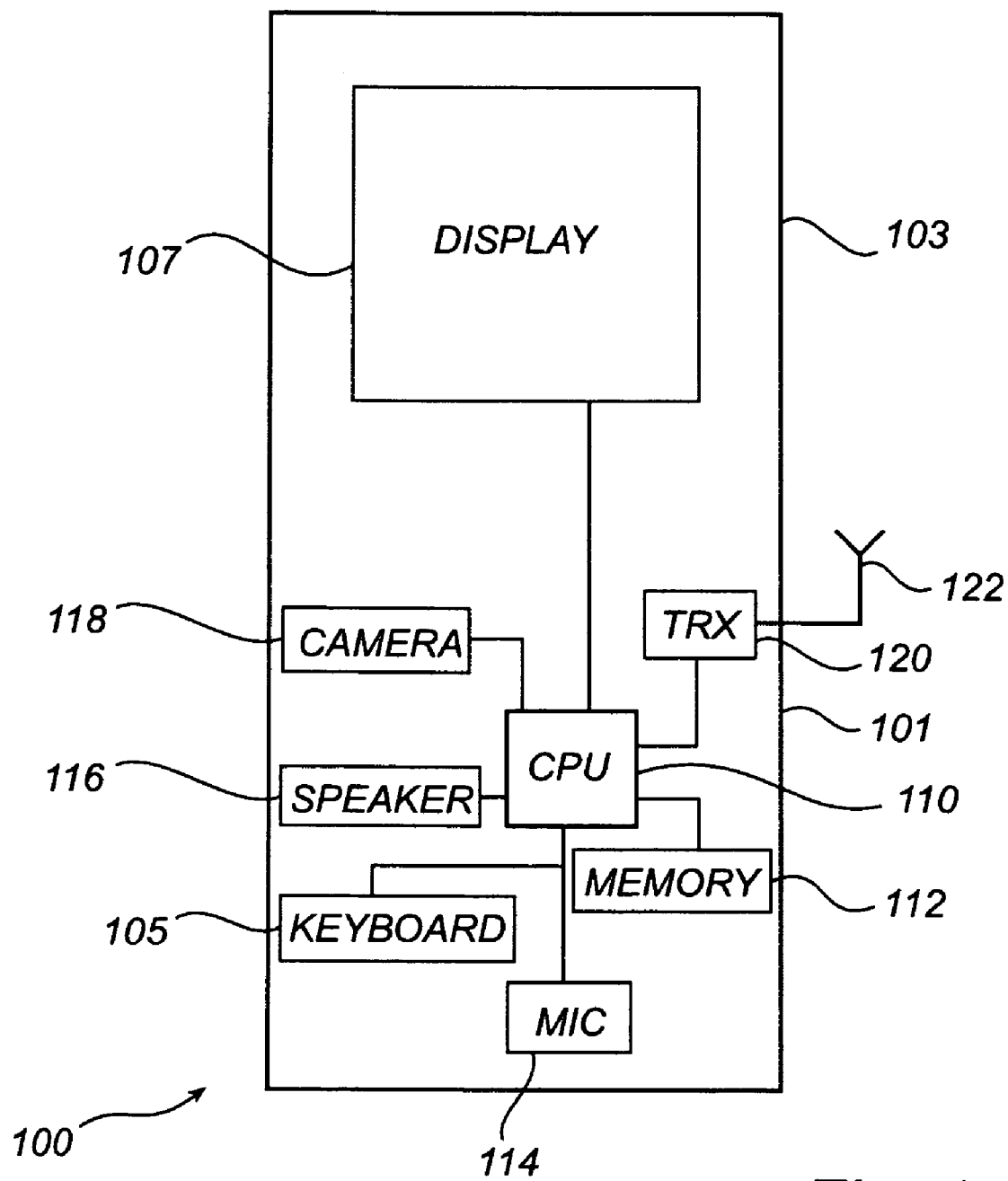
FIG. 1 schematically illustrates a functional block diagram of a mobile communication terminal according to an embodiment of the present invention.

FIG. 1 shows a block diagram of a mobile communication terminal in the form of a telephone 100 according to the present invention. A first body part 101 comprises a processing unit 110 connected to an antenna 122 via a transceiver 120, a memory unit 112, a microphone 114, a keyboard 105, a speaker 116 and a camera 118. The processing unit 110 is also connected to a display 107, which is comprised in a second body part 103 of the telephone 100.

No detailed description will be presented regarding the specific functions of the different blocks of the telephone 100. In short, however, as the person skilled in the art will realize, the processing unit 110 controls the overall function of the functional blocks in that it is capable of receiving input from the keyboard 105, audio information via the microphone 114, images via the camera 118 and receive suitably encoded and modulated data via the antenna 122 and transceiver 120. The processing unit 110 is also capable of providing output in the form of sound via the speaker 116, images via the display 107 and suitably encoded and modulated data via the transceiver 120 and antenna 122.

Figure 2:
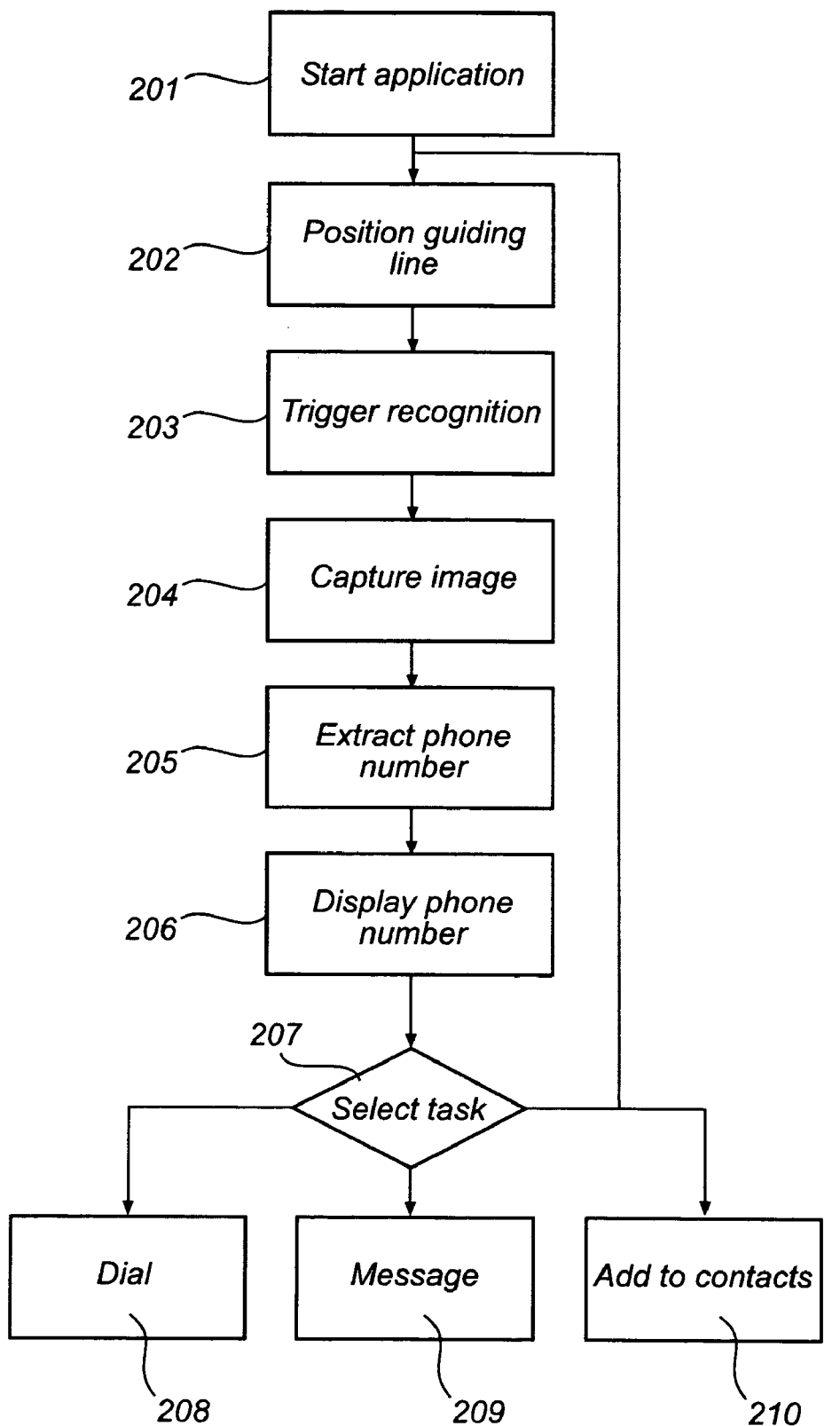
FIG. 2 is a flowchart of a method according to the present invention.
Figure 3A:
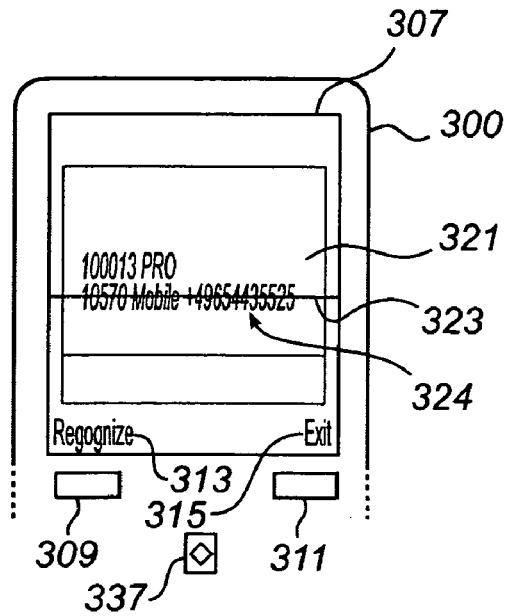
FIGS. 3a-3c illustrate views of a display of a communication terminal when performing a method according to the present invention.

A method according to the invention will now be described with reference to a flow chart in FIG. 2 and views of a display 307 located in a mobile communication terminal 300 in FIGS. 3a, 3b, and 3c. The display 307 may be the display 107 of the camera equipped terminal discussed with reference to FIG. 1. Below the display 307, are two control keys 309 and 311 located. These control keys 309, 311 may be used, as exemplified below, to trigger functions to perform that are identified by displayed text strings 313, 315, 317, 319. Moreover, the method is preferably implemented as software steps stored in a memory and executed in a CPU, e.g. the memory 112 and CPU 110 of the terminal 100 in FIG. 1.

In a start application step 201, a user starts a camera assisted dialing application. At this time the field of view 321 of a camera (not shown) is continuously displayed on the display 307. Superimposed on the displayed camera view 321 is a guiding pattern in the form of a line 323. As a person skilled in the art will realize, starting the application can be performed in a multitude of ways, including using a menu system, pressing a dedicated hardware button, or using voice control. Moreover, the guiding pattern may be any suitable pattern, such as a rectangle, etc.

In a position guiding line step 202, the user adjusts the field of view 321 of the camera to position the guiding line 323 vertically centered on a sequence of digits 324 to be recognized. In FIG. 3a, a screenshot of this situation is shown.

In a trigger recognition step 203, the user triggers recognition of the phone number by pressing the control key 309 associated with text 313 indicating to the user that the current function of the control key 309 is to "Recognize".

In a capture image step 204, the image pointed to by the camera is captured in the terminal and stored for further processing, as discussed below.

In an extract phone number step 205, a sub-image, i.e. a part of the captured image, centered around the guiding line 323 is extracted. As the skilled person will realize, the extraction of the sub-image may be performed using known image processing functions. This image data in the sub-image is analyzed and interpreted as a sequence of digits and possibly a plus sign. Any other characters are discarded, resulting in a sequence of characters making up a phone number. As the skilled person will realize, this is performed using known optical character recognition (OCR) processing functions.

Figure 3B:
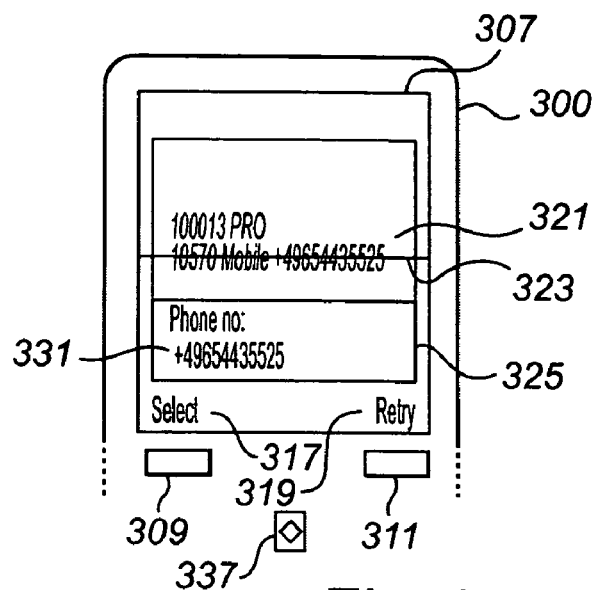
Figure 3C:
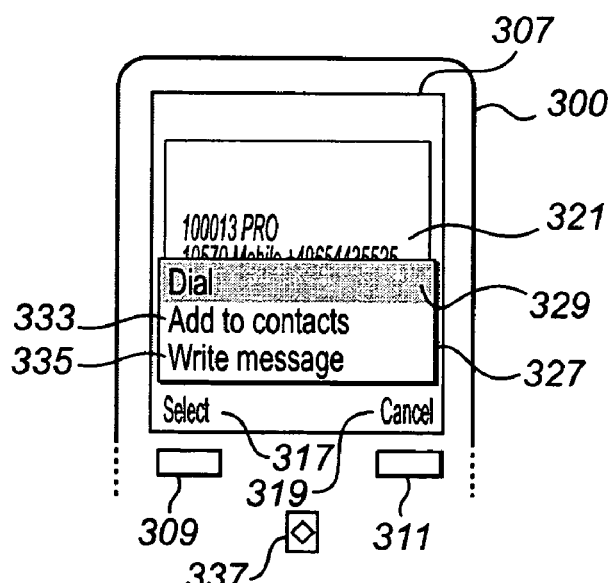

In a display phone number step 206, the phone number 331 that has been recognized is presented to the user in a pop-up window 325 as shown in FIG. 3b. The pop-up window 325 acts as a user interface element where the phone number 331 can be modified by the user if necessary, e.g. if the recognition did not recognize the phone number correctly.

In a select task step 207, the user selects if the extracted phone number is to be used to dial the phone number 331, to send a message to the phone number 331, or to add the phone number 331 to a contact database in the terminal. Also, at this stage the user may discard the number 331 and return to the position guiding line step 202. This selection is performed by selecting a menu item 329, 333, 335 from menu 327, using the control key 309. The user can change the highlighted task 329 shown in the menu 327 by pressing a navigation button 337. Once a desired task is highlighted, the desired task is confirmed by pressing the control key 309. Canceling and discarding the phone number is performed by way of pressing the control key 311.

Depending on the selection in the select task step 207, the extracted phone number 331 is used in a dial step 208, as the destination phone number of a voice or video call.

Depending on the selection in the select task step 207, the extracted phone number 331 is used in a message step 209, as the destination phone number for a message, e.g. a short message or multimedia message in a GSM system.

Depending on the selection in the select task step 207, the extracted phone number 331 is added to a record in a contact database, in an add to contact step 210. It may then be added as any type of phone number, including mobile, work, home, or fax number, as the skilled person will realize.

The invention claimed is:

1. A method comprising:
displaying a guiding pattern configured such that it facilitates for a user to adjust a camera view of a mobile communication terminal while the terminal is in an image recording mode,
recording an image,
receiving user defined position information that defines a position of a sub-image within the recorded image,
extracting the sub image comprising an array of picture elements from the recorded image, said sub-image being at a position within the recorded image that corresponds with the guiding pattern being displayed,
performing an optical character recognition process on the extracted sub-image, yielding a sequence of symbols,
displaying the recognized sequence of symbols,
receiving a signal indicating that the recognized sequence is to be interpreted as a telephone number, and
initiating a control application of the mobile communication terminal, an input to which is the telephone number.

2. The method according to claim 1, where initiating the control application comprises initiation of a telephone call using the telephone number.

3. The method according to claim 1, where initiating the control application comprises initiation of a message transmission using the telephone number.

4. The method according to claim 1, where initiating the control application comprises initiation of a contact management application into which the telephone number is stored.

5. The method according to claim 1, wherein the step of displaying the guiding pattern comprises displaying a straight line extending the width of a display.

6. The method according to claim 1, wherein the step of displaying the guiding pattern comprises displaying a rectangle.

7. The method according to claim 1, wherein the step of displaying the guiding pattern comprises displaying any number of symbols selected from a set of symbols, said set of symbols comprising square brackets ('[', ']'), plus signs ('+'), vertical lines ('|'), arrows ('→', '←'), L-shapes ('☐', '☐').

8. The method according to claim 1, wherein the step of receiving position information includes receiving position indication signals from touch-sensing means of a display unit in the terminal.

9. The method according to claim 1, where displaying the recognized sequence of symbols comprises displaying the recognized sequence of symbols in a pop-up window.

10. An apparatus comprising:
a computer useable medium having computer readable program code means embodied therein for causing a computer to control a mobile communication terminal, while the terminal is in an image recording mode during which a camera view of a camera is displayed on a display unit, the computer readable code means in the mobile communication terminal comprising:
computer readable program code means for causing a computer to display a guiding pattern configured such that it facilitates for a user to adjust the camera view;
computer readable program code means for causing a computer to record an image;
computer readable program code means for causing a computer to receive user defined position information that defines a position of a sub-image within the recorded image;
computer readable program code means for causing a computer to extract the sub-image comprising an array of picture elements from the recorded image, said sub-image being at a position within the recorded image that corresponds with the guiding pattern being displayed;
computer readable program code means for causing a computer to perform an optical character recognition process on the extracted sub-image, yielding a sequence of symbols;
computer readable program code means for causing a computer to display the recognized sequence of symbols;
computer readable program code means for causing a computer to receive a signal indicating that the recognized sequence is to be interpreted as a telephone number; and
computer readable program code means for causing a computer to initiate a control application, an input to which is the telephone number.

11. A computer program product embodied in a memory of a device comprising:
a computer useable medium having computer readable code means embodied therein for causing a computer to control a mobile communication terminal, while the terminal is in an image recording mode during which a camera view of a camera is displayed on a display unit, the computer readable code means in the computer program product comprising:
computer readable program code means for causing a computer to display a guiding pattern configured such that it facilitates for a user to adjust the camera view;
computer readable program code means for causing a computer to record an image;
computer readable program code means for causing a computer to receive user defined position information that defines a position of a sub-image within the recorded image;
computer readable program code means for causing a computer to extract the sub-image comprising an array of picture elements from the recorded image, said sub-image being at a position within the recorded image that corresponds with the guiding pattern being displayed;
computer readable program code means for causing a computer to perform an optical character recognition process on the extracted sub-image, yielding a sequence of symbols;
computer readable program code means for causing a computer to display the recognized sequence of symbols;
computer readable program code means for causing a computer to receive a signal indicating that the recognized sequence is to be interpreted as a telephone number; and
computer readable program code means for causing a computer to initiate a control application, an input to which is the telephone number.

12. A user interface comprising:
a display; and
a processor connected to the display, the processor being configured to,
cause a guide pattern to be presented on the display, the guide pattern being configured such that it facilitates for a user to adjust a camera view of a mobile communication terminal while the terminal is in an image recording mode,
record an image,
receive user defined position information that defines a position of a sub-image within the recorded image,
extract the sub-image comprising an array of picture elements from the recorded image, said sub-image being at a position within the recorded image that corresponds with the guiding pattern being displayed,
perform an optical character recognition process on the extracted sub-image, yielding a sequence of symbols,
display the recognized sequence of symbols,
receive a signal indicating that the recognized sequence is to be interpreted as a telephone number, and
initiate a control application of the mobile communication terminal, an input to which is the telephone number.

13. The user interface according to claim 12, where the control application comprises a telephone call using the telephone number.

14. The user interface according to claim 12, where the control application comprises a message transmission using the telephone number.

15. The user interface according to claim 12, where the control application comprises a contact management application into which the telephone number is stored.

16. The user interface according to claim 12, wherein the guiding pattern comprises a straight line extending the width of a display.

17. The user interface according to claim 12, wherein the guiding pattern comprises a rectangle.

18. The user interface according to claim 12, wherein the guiding pattern comprises any number of symbols selected from a set of symbols, said set of symbols comprising square brackets ('[', ']'), plus signs ('+'), vertical lines ('|'), arrows ('->', '<+'), L-shapes ('☐', '☐').

19. The user interface according to claim 12, wherein the position information includes position indication signals from touch-sensing means of a display unit in the terminal.

* * * * *